United States Patent [19]

Tellis

[11] 4,271,133
[45] Jun. 2, 1981

[54] PROCESS FOR REMOVING HYDROGEN CYANIDE FROM GASEOUS STREAMS

[75] Inventor: Cyril Tellis, Charleston, W. Va.

[73] Assignee: Union Carbide Corporation, New York, N.Y.

[21] Appl. No.: 135,779

[22] Filed: Mar. 31, 1980

[51] Int. Cl.³ .............................................. B01D 53/34
[52] U.S. Cl. .................................. 423/230; 423/236; 423/240; 423/244; 55/68; 55/71; 55/73; 55/84; 252/190; 252/192
[58] Field of Search ............... 423/270, 230, 231, 236, 423/240, 241, 244, 239, 373, 622; 55/73, 68, 71, 84; 252/475, 182, 184, 189, 190, 192

[56] References Cited

U.S. PATENT DOCUMENTS

| 2,239,000 | 4/1941 | Groombridge et al. | 252/373 |
|---|---|---|---|
| 2,423,689 | 7/1947 | Day | 252/190 |
| 3,441,370 | 4/1979 | Gutmann et al. | 423/244 |
| 3,492,083 | 1/1970 | Lowicki et al. | 423/244 |
| 4,009,009 | 2/1977 | Massoth et al. | 55/73 |
| 4,088,736 | 5/1978 | Courty et al. | 423/230 |
| 4,128,619 | 12/1978 | Robinson | 423/244 |

FOREIGN PATENT DOCUMENTS 12540  3/1976  United Kingdom .

*Primary Examiner*—Earl C. Thomas
*Attorney, Agent, or Firm*—Bernard Lieberman

[57] ABSTRACT

This invention relates to a process for reducing the hydrogen cyanide content of a gaseous stream which comprises providing an adsorbent bed wherein the adsorbent comprises zinc oxide and contains no more than 5%, by weight, of an oxide of an alkali or alkaline earth metal, and contacting said process stream with said adsorbent bed at a temperature of from about ambient to about 350° C. for a period of time sufficient to reduce the concentration of hydrogen cyanide in said gaseous stream to the desired value.

10 Claims, No Drawings

PROCESS FOR REMOVING HYDROGEN CYANIDE FROM GASEOUS STREAMS

CROSS-REFERENCE TO RELATED APPLICATION

This application is related to copending U.S. application Ser. No. 135,784 filed on even date herewith which describes a process for reducing the carbonyl sulfide content of a gaseous stream using a zinc oxide adsorbent.

BACKGROUND

This invention relates to the removal of hydrogen cyanide from gaseous process streams. More particularly, the invention relates to the treatment of such process streams with adsorbent beds containing zinc oxide to reduce the hydrogen cyanide content of such streams to very low levels of concentration.

Synthesis gas is an increasingly important feedstock in the chemical industry. Existing or proposed commercial processes using synthesis gas (i.e. gaseous mixtures containing hydrogen and carbon monoxide) include processes for the manufacture of methanol, ethanol, the production of aldehydes by the oxo process, the production of glycols using rhodium catalysts, and the production of purified hydrogen and carbon monoxide streams. In most of these processes, the use of sensitive catalyst materials requires that contaminants such as sulfur compounds and hydrogen cyanide be removed from the gas to concentration levels of less than 1 part per million, by volume (hereinafter referred to as "ppmv"), and often to levels below 0.1 ppmv.

Synthesis gas mixtures typically contain a variety of impurities among which are sulfur compounds such as hydrogen sulfide ($H_2S$), carbonyl sulfide (COS), sulfur dioxide ($SO_2$) carbon disulfide ($CS_2$) and methyl mercaptan ($CH_3SH$), as well as hydrogen cyanide (HCN), hydrogen chloride (HCl) and others. The relative concentrations of these impurities in the gas depends on the feedstock from which the synthesis gas is derived. Generally, a gaseous feedstock, such as methane, introduces less contaminants into the synthesis gas than liquid feedstocks, such as naptha, gas oil, atmospheric residue (the bottom fraction obtained from an atmospheric crude refining still) and vacuum residue (the bottom fraction obtained from the vacuum refining of heavy feedstocks such as crude oil and atmospheric residue). Coal derived synthesis gases generally contain the highest concentration of sulfur compounds.

Present purification schemes typically utilize a reactive liquid absorbent such as aqueous ethanolamines, alkali carbonates and hydroxides, or sodium thioarsenite as a primary purification agent to absorb high levels of the various species of impurities and generally reduce them to levels of about 1 to 10 ppmv. Alternatively, a non-reactive physical absorbent such as methanol at cryogenic temperatures may be used as the primary purification agent. Purifying the gaseous stream to a higher degree with such absorbents is uneconomical because of the disproportionately large amounts of energy which would be required to regenerate the spent absorbent.

Accordingly, the effluent gas from a primary purification step usually requires further treatment to reduce the impurities to acceptable levels. Adsorbents to accomplish such purification are extensively described in the prior art. The prior art literature relating to adsorbents for gaseous purification concerns itself, for the most part, with eliminating sulfur compounds from gas streams, in particular $H_2S$. Thus, for example, U.S. Pat. No. 3,441,370 describes the removal of $H_2S$ with the use of a zinc oxide adsorbent at a temperature from ambient to 800° F. The removal of COS and RSH is also suggested, but only at temperatures above 500° F. However, no data is provided in the patent to support this suggestion. U.S. Pat. No. 4,009,009 describes the removal of COS from arsenic-free gas streams with the use of alumina-supported lead oxide. Great Britain Application No. 012,540, filed Mar. 29, 1976 (corresponding to German Offenlegungshrift 2,650,711 published June 10, 1977) discloses the use of zinc oxide as an absorbent for hydrogen sulfide. The examples of the application show the removal of carbonyl sulfide along with $H_2S$, but the presence of carbonyl sulfide in the inlet feed gas is said to be restricted to small amounts (page 4, col. 2).

U.S. Pat. No. 3,492,083 broadly describes the removal of $H_2S$ and COS from an industrial gas using as an adsorbent a mixture comprising oxides of aluminum, zinc, iron and/or manganese in combination with oxides of the alkaline earth and/or alkali metals. Adsorption is carried out at a temperature of from 100° to 300° C. The examples of the patent only disclose the removal of $H_2S$ and $SO_2$ from the various gases. U.S. Pat. No. 4,128,619 discloses a desulfurization process carried out at a temperature from 100°–400° C. using zinc oxide as the adsorbent. Hydrogen sulfide is the only sulfur compound which is shown removed in the examples of the patent. U.S. Pat. No. 2,239,000 discloses the removal of sulfur from gas mixtures comprising hydrogen and carbon monoxide at a temperature from 400° C.–600° C. using catalytic mixtures of zinc and iron oxides or zinc and chromium oxides.

The removal of hydrogen cyanide from a gas stream using soda lime as an absorbent is disclosed in U.S. Pat. No. 2,423,689. The addition of up to 10 percent by weight of zinc oxide to the soda lime is suggested for purposes of increasing the life and hardness of the soda lime.

Thus, while zinc oxide is generally known in the prior art as an adsorbent for the removal of sulfur compounds, such as, $H_2S$ and $CH_3SH$, there has heretofore been no appreciation regarding its capability as an adsorbent for HCN.

DETAILED DESCRIPTION OF THE INVENTION

The invention comprises a process for reducing the HCN content of a gaseous stream by providing an adsorbent bed for the removal of HCN wherein the adsorbent in said bed is comprised of zinc oxide and contains no more than about 5 percent, by weight, of an oxide of an alkali or alkaline earth metal. The process stream is contacted with said adsorbent bed at a temperature of from about ambient to about 350° C. for a period of time sufficient to reduce the content of hydrogen cyanide in the gaseous stream to the desired concentration.

The invention is predicated on the discovery that zinc oxide is an effective adsorbent for HCN, and that it can be used to remove such impurity from gaseous process streams at commercially practical temperatures and space velocities to concentrations below the detectable limit of HCN in such gaseous stream, namely, a concentration in the range of 5-10 parts per billion, by volume (ppbv).

The adsorbent composition may include up to 5 percent, by weight of an alkali metal oxide and/or an alkaline earth metal oxide. However, the presence of such oxides is not critical for purposes of the invention. The terms "alkali" and "alkaline earth" metals as used herein refers to the metals of groups 1A and 2A of the Periodic Table of the elements, Handbook of Chemistry and Physics, 51st. Edition (1970-1971).

The purification of a gaseous stream in accordance with the invention is intended to encompass a fixed bed operation as well as the use of a moving or fluidized adsorbent bed. The particular method of contacting the gaseous stream with the adsorbent bed is not critical for purposes of this invention.

The gaseous stream to be purified is generally a hydrocarbon process stream which, in addition to HCN, may contain other impurities, such as COS, $H_2S$ and HCl, generally, in concentrations from about 1 to 100 ppmv. All four of such impurities are adsorbed on zinc oxide at the process conditions at which HCN adsorption is effected thereby allowing for the simultaneous removal of such impurities to concentrations below 0.1 ppmv, and even as low as 5 parts per billion, by volume, using a single adsorbent bed. This is a significant advantage relative to prior art purification schemes wherein the removal of such impurities from a gaseous stream to very low levels of concentration generally requires a different adsorbent bed for each impurity.

The removal of impurities other than HCN from the inlet process stream may be advantageously carried out in a primary purification step using regenerable liquid absorbents which are known in the art. Thus, for example, gaseous sulfur compounds, such as $H_2S$ and $SO_2$ may be suitably removed from the process stream prior to removal of HCN using liquid solutions of ethanolamines or alkali hydroxides. Similarly, a portion of the HCN in the process stream may be initially removed by the aforementioned absorbents or in an ammonia solution prior to reducing the HCN content to the desired final concentrations in accordance with the present invention.

The invention may be suitably carried out over a temperature range of from ambient to about 350° C.; temperatures from about 150° C. to 300° C. being generally preferred. Higher temperatures within this range generally favor the rate of reaction of zinc oxide with HCN, i.e., the reaction kinetics. The process may be carried out at atmospheric pressure, but higher pressures generally enhance the reaction kinetics due to the increased partial pressure of HCN in the bed.

EXAMPLES

The examples summarized in Table I below illustrate the removal of hydrogen cyanide from a gaseous stream using zinc oxide adsorbent beds in accordance with the invention.

The adsorbent bed consisted of a sealed cylindrical 316 stainless steel tube, 1 foot long x one inch I.D. containing about 60 cc of United Catalysts, Inc. type C7-2-01 zinc oxide catalyst in the form of 3/16 inch diameter pellets. The adsorbent composition was as follows:

| COMPONENT | WEIGHT PERCENT |
|---|---|
| Zinc Oxide | 80 ± 5% |
| Carbon | <0.20 |
| Sulfur | <0.15 |
| Silica | 5-10 |
| Alumina | 4-6 |
| Alkali and Alkaline Earth Metal Oxides | 0.05-0 |

The reactor tube was heated externally with resistance heaters insulated with ceramic having a total power output of 1.1 KW to provide the desired bed temperature within the tube as measured and controlled by thermocouples located in the bed in conjunction with a temperature controller. A synthesis gas carrier (1:1 volume ratio of $H_2/CO$) was mixed in the appropriate ratio with a known concentrated stream of HCN in a synthesis gas of the same composition to provide gaseous streams having the desired concentrations of HCN. The total gas flow to the bed was measured by a flow meter. The concentration of HCN in the gaseous stream entering the bed was analyzed on-line with a Hewlett Packard gas chromatograph equipped with an alkali flame ionization detector (or thermionic detector) selective for nitrogen and phosphorous compounds. The instrument was capable of detecting HCN in concentrations as low as 5 parts per billion of the synthesis gas.

All tubing leading to the adsorbent bed from the gas source consisted of either 304 stainless steel or Teflon (a trademark of E. I. DuPont and Co.). Becuase of the known tendency of impurities such as HCN, $H_2S$ and COS to adsorb on metal surfaces, such as iron or steel, all the metal tubing was initially wshed with caustic and then treated with Siliclad (a water soluble silicone concentrate manufactured by Becton, Dickinson and Company, Parsippany, New Jersey 07054) to provide an inert coating inside the tubing which effectively precludes adsorption of HCN on the metal surfaces. The treatment consisted of immersing the tubing in a 1 weight percent solution of Siliclad in water for about 5 seconds followed by rinsing in water to remove excess solution from the metal surface. The coated surfaces were then air dried for about 24 hours.

A synthesis gas stream containing HCN at various levels of concentration was passed through the adsorbent bed at the temperatures indicated in Table I. The gas was vented through a back pressure regulator which maintained the pressure in the bed at 100 psig. After steady-state conditions had been reached, the inlet feed stream and the reactor effluent were monitored for hydrogen cyanide. The data in Table I indicates that over the wide range of space velocities and temperatures covered in the examples, at least 90% of the HCN in the inlet feed was always removed by the adsorbent bed.

TABLE I

REMOVAL OF HCN WITH ZINC OXIDE ADSORBENT BEDS

| Example | Bed[1] Temperature, °C. | Space Velocity[2] Std. Cond. (hr$^{-1}$) | HCN Concentration[3] (ppmv) Inlet | Exit |
|---|---|---|---|---|
| 1 | 120 | 2000 | 2.92 | None detected |
| 2 | 200 | 400 | 2.01 | None detected |
| 3 | 200 | 2000 | 17.5 | .011 |
| 4 | 120 | 2000 | 21.5 | 2.15 |
| 5 | 160 | 1200 | 11.5 | .056 |

TABLE I-continued
REMOVAL OF HCN WITH ZINC OXIDE ADSORBENT BEDS

| Example | Bed[1] Temperature, °C. | Space Velocity[2] Std. Cond. (hr$^{-1}$) | HCN Concentration[3] (ppmv) | |
|---|---|---|---|---|
| | | | Inlet | Exit |
| 6 | 120 | 400 | 21.8 | .016 |
| 7 | 200 | 400 | 19.2 | .018 |
| 8 | 200 | 2000 | 2.02 | .011 |
| 9 | 120 | 400 | 2 | .003 |

[1] Actual bed temperatures were within 2° C. of the indicated values.
[2] Space Velocity is the volume of gas per hour per volume of bed measured at 20° C. and 760 mm Hg.
[3] The inlet and exit concentrations represent the average of at least 3 chromatograph readings to minimize the effect of instrument error at the low concentrations of the examples; the exit concentrations represent the concentrations achieved at steady-state conditions.

What is claimed is:

1. A process for reducing the hydrogen cyanide content of a gaseous stream which comprises:
   (a) providing an adsorbent bed wherein the adsorbent comprises zinc oxide and contains no more than 5%, by weight, of an oxide of an alkali or alkaline earth metal, and
   (b) contacting said process stream with said adsorbent bed at a temperature of from about ambient to about 350° C. for a period of time sufficient to reduce the concentration of hydrogen cyanide in said gaseous stream to the desired value.

2. The process of claim 1 wherein the temperature of said adsorbent is from about 150° C. to about 300° C.

3. The process of claim 1 wherein said process stream additionally contains hydrogen sulfide as an impurity.

4. The process of claim 1 wherein said process stream additionally contains hydrogen chloride as an impurity.

5. The process of claim 1 wherein the concentration of hydrogen cyanide in the process stream prior to contacting said adsorbent bed is from about 1 to about 100 parts per million (by volume).

6. The process of claim 1 wherein the concentration of hydrogen cyanide in the process stream is reduced to below 0.1 parts per million (by volume).

7. A process for purifying a gaseous stream containing hydrogen cyanide, carbonyl sulfide, hydrogen sulfide and hydrogen chloride as impurities therein which comprises:
   (a) providing an adsorbent bed wherein the adsorbent comprises zinc oxide and contains no more than 5%, by weight, of an oxide of an alkali or alkaline earth metal, and
   (b) contacting said process stream with said adsorbent bed at a temperature of from about ambient to about 350° C. for a period of time sufficient to reduce the concentrations of each of said impurities to the desired value.

8. The process of claim 7 wherein the concentration of carbonyl sulfide, hydrogen sulfide, hydrogen chloride and hydrogen cyanide in the gaseous stream prior to contacting said adsorbent bed is from about 1 to 100 ppmv.

9. The process of claim 7 wherein the concentration of each of said impurities in the gaseous stream is reduced to below 0.1 ppmv.

10. The process of claim 7 wherein the temperature of said adsorbent is from about 150° to about 300° C.

* * * * *